United States Patent
Apostolos et al.

(10) Patent No.: US 10,944,297 B2
(45) Date of Patent: Mar. 9, 2021

(54) LOW FREQUENCY RECTENNA SYSTEM FOR WIRELESS CHARGING

(71) Applicant: AMI Research & Development, LLC, Merrimack, NH (US)

(72) Inventors: John T. Apostolos, Lyndeborough, NH (US); James D. Logan, Candia, NH (US); William Mouyos, Windham, NH (US)

(73) Assignee: AMI Research & Development, LLC, Merrimack, NH (US)

( * ) Notice: Subject to any disclaimer, the term of this patent is extended or adjusted under 35 U.S.C. 154(b) by 0 days.

(21) Appl. No.: 16/569,814

(22) Filed: Sep. 13, 2019

(65) Prior Publication Data

US 2020/0006989 A1 Jan. 2, 2020

Related U.S. Application Data

(62) Division of application No. 15/627,779, filed on Jun. 20, 2017, now abandoned.

(60) Provisional application No. 62/352,186, filed on Jun. 20, 2016, provisional application No. 62/372,355, filed on Aug. 9, 2016.

(51) Int. Cl.
| | |
|---|---|
| *H02J 7/00* | (2006.01) |
| *H02J 50/27* | (2016.01) |
| *H02J 50/23* | (2016.01) |
| *H01Q 7/00* | (2006.01) |
| *H01Q 9/16* | (2006.01) |
| *H02J 7/02* | (2016.01) |

(52) U.S. Cl.
CPC .............. *H02J 50/27* (2016.02); *H01Q 7/00* (2013.01); *H01Q 9/16* (2013.01); *H02J 7/025* (2013.01); *H02J 50/23* (2016.02)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS

| | | | |
|---|---|---|---|
| 5,151,707 A | * | 9/1992 | Kumpfbeck .......... H01Q 1/287 343/705 |
| 8,988,303 B1 | | 3/2015 | Apostolos et al. |
| 9,013,360 B1 | | 4/2015 | Apostolos et al. |
| 9,825,674 B1 | | 11/2017 | Leabman |
| 9,853,458 B1 | | 12/2017 | Bell et al. |
| 10,027,180 B1 | | 7/2018 | Hosseini |

(Continued)

FOREIGN PATENT DOCUMENTS

WO 02071536 A1 9/2002

OTHER PUBLICATIONS

U.S. Appl. No. 15/362,988, filed Nov. 29, 2016 by Apostolos et al., entitled "Super Directive Array of Volumetric Antenna Elements for Wireless Device Applications", 58 pages.

(Continued)

*Primary Examiner* — Arun C Williams
(74) *Attorney, Agent, or Firm* — David J. Thibodeau, Jr.; VLP Law Group LLP

(57) ABSTRACT

A human safe wireless charging system using a circularly polarized source antenna that can radiate in either a hemispherical pattern or directional cardiod-like patterns at a 40-50, 150, or 200 MHz frequencies to a receiving loop antenna which is coupled to a parasitic receive element.

16 Claims, 11 Drawing Sheets

(56) References Cited

U.S. PATENT DOCUMENTS

| | | |
|---|---|---|
| 2007/0247374 A1 | 10/2007 | Nishikido et al. |
| 2009/0045772 A1 | 2/2009 | Cook et al. |
| 2011/0281535 A1 | 11/2011 | Low et al. |
| 2012/0299396 A1 | 11/2012 | Baden |
| 2013/0241308 A1 | 9/2013 | Bilbrey et al. |
| 2014/0176385 A1 | 6/2014 | Apostolos et al. |
| 2014/0241557 A1 | 8/2014 | Martius et al. |
| 2015/0378313 A1 | 12/2015 | Abe et al. |
| 2016/0109611 A1 | 4/2016 | Simon |
| 2016/0285173 A1* | 9/2016 | Svendsen ............... H01Q 5/328 |

OTHER PUBLICATIONS

Gupta, et al., "Unveiling Magnetic Dipole Radiation in Phase-Reversal Leaky-Wave Antennas," IEEE Antennas and Wireless Propagation Letters; 13, pp. 786-789 (2014).
Partial Supplementary European Search Report dated Mar. 27, 2020 for Related European Application No. 17816034.7.
International Search Report and Written Opinion dated Sep. 25, 2017 for Related PCT Application No. PCT/US17/038265.

\* cited by examiner

Optional: ORIAN Supergain*Array

Built in Beamformer

Any Combination of 8 High Gain Beams (10DBI)
and One Low Gain Beam may be Generated The High Gain Array has a Badwidth of 50 kHZ
at a Center Frequency of 100 mHZ (Q = 2000)

* Antenna History Part 1, Collin and Zucker, McGraw Hill 1969

Loop Pattern

Dipole Pattern

Table Top Superdirective ORIAN Array

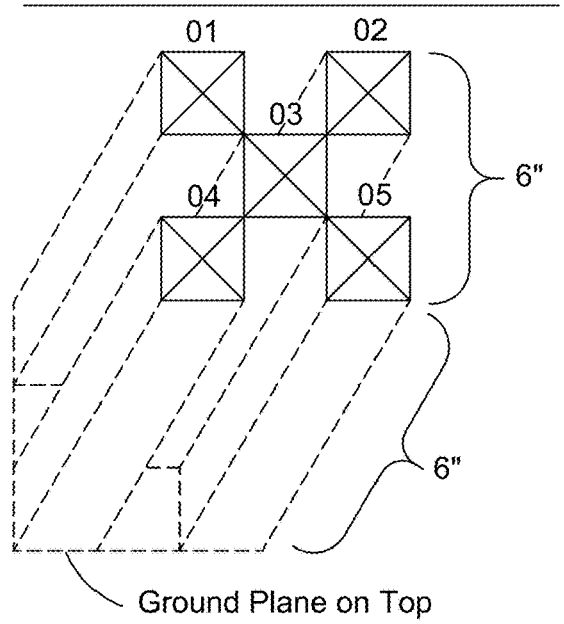

Ground Plane on Top

* Beam Selection

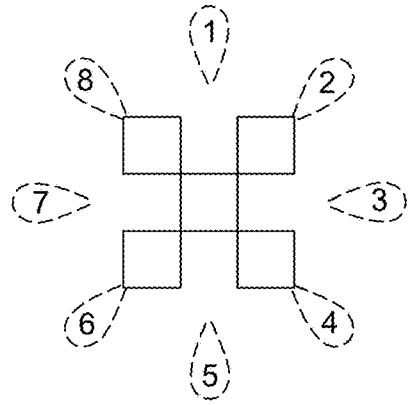

| Direction | Element Selection |       |         |
|-----------|-------------------|-------|---------|
| 1,5       | (01,02)           | (03)  | (04,05) |
| 3,7       | (02,05)           | (03)  | (01,04) |
| 6,2       | (04)              | (03)  | (02)    |
| 8,4       | (01)              | (03)  | (05)    |

* To Generate an Omni Beam, All Directions are Simultaneously Selected

* All Combinations are Software Controlled

* 03 is the Only Directly Fed ORIAN Element

* 01, 02, 04, 05 are Parasitically Excited Depending Upon Which of the 8 Beams is Desired

* The Parasitic Elements are Controlled by Switch in Capacitors with Pin Diode Switches. The Capacitors Tune the Element Slightly Above or Below Resonance to Act as a Director or a Reflector. If a Capacitor is not Switched on, the Element is in effect absent. There is a Switch in Each Element

*FIG. 9*

LOW FREQUENCY RECTENNA SYSTEM FOR WIRELESS CHARGING

RELATED APPLICATIONS

This patent application claims priority to co-pending U.S. patent application Ser. No. 15/627,779 filed Jun. 20, 2017 entitled "Low Frequency Rectenna System For Wireless Charging", which in turn claims priority to U.S. Provisional Patent Application No. 62/352,186 filed on Jun. 20, 2016 entitled "Low Frequency Rectenna System For Wireless Charging" and U.S. Provisional Patent Application No. 62/372,355 filed on Aug. 9, 2016 entitled "Low Frequency Rectenna System For Wireless Charging", each of which are hereby incorporated by reference.

BACKGROUND OF INVENTION

Technical Field

The present application is directed to the charging of electronic devices, and in particular to the wireless charging of battery enabled devices.

Description of the Related Art

Since the beginning of the mobile radio era, users have been plagued with limited battery life and the chore of plugging their devices into a charger. Where radios and wireless devices have separated the user from wires to transmit data, these devices remained chained to chargers for power.

In recent years, there have been several efforts to wirelessly charge mobile devices. Power Matters Alliance (PWA) relies on magnetic induction. Basically, the PMA solution to wireless charging depends on the alignment of a transmitter coil (typically on a charging pad) and receiving coil (in the device). An alternating magnetic field generated by the transmitter coil is converted to electrical current by the receiver, and the battery recharges. Qi, another standard, also recharges using magnetic induction. Both of these technologies require the device receiving power to be physically close to the charger and to be aligned with the transmitter coils. While not requiring a wire to be plugged in, they do require the user to take actions to place the device on the charger and align the device.

The Alliance for Wireless Power (A4WP) deploys magnetic resonance charging, taking a principle that has been in play since Nicola Tesla and applying it to powering smartphones. It is similar to magnetic induction, in that it relies on the interplay of coils, but trades power transfer rates for the added convenience of not needing to perfectly align transmitter and receiver.

But both of these solutions charge through close contact or over a short distance. They require the user to take an active step to charge, and require the user to remember to charge the phone periodically.

Another approach to wireless charging is to send power through the air with radio waves. There are several companies who have tried this approach, from TechNovator's XE product to Energous and Ossia. However, we understand that these technologies transmit polarized energy to the receiving device, again requiring specific orientation of the device. The receiving devices also require their own specialized antennas, thus requiring additional cost and space to be taken by the charging technology.

The devices described herein eliminate the issues articulated above as well as other issues with the currently known products.

Technical Background

The Federal Communications Commission (FCC), Institute for Electrical and Electronic Engineers (IEEE), the US Occupational Safety and Health Agency (OSHA), the International Commission on Non-Ionizing Radiation (ICNIRP), the US Labor Department, and the US Environmental Protection Agency (EPA) have all set standards for non-ionizing radiation that a human can be exposed to. The EPA suggests that humans limit their exposure to 0.6 to 14.78 watts per meter squared ($W/m^2$). The FCC, IEEE, OSHA, ICNIRP, and the Labor Department set the standard limits to 10 $W/m^2$ from 100-300 MHz. However, at 3 feet, a typical computer emits 59.1 $W/m^2$. Many other household appliances exceed the EPA recommendations: a vacuum cleaner could be 3782 $W/m^2$, a hair dryer could be 85.11 $W/m^2$, and a microwave oven could be 1478 $W/m^2$.

Scientific research has shown that the higher frequency electro-magnetic fields interact more strongly with human tissue and have a more detrimental biological impacts on exposed tissues. Radio frequency and microwave radiation exposure are genotoxic (causing genetic damage). The only absolutely safe exposure level is an exposure level of zero.

The non-ionizing radiation is attenuated as it passes through various materials. Most of the attenuation data is for frequencies above 900 MHz. At lower frequencies the attenuation is lower. Four inches of concrete will cause a loss of 12 dB at 900 MHz; a 3.5 inch brick causes a 3.5 dB loss; 3 inches of lumber a 2.8 dB loss; and 0.5 inch of glass will cause a 2 dB loss.

SUMMARY

A wireless charging system using radio frequency (RF) power transmission at, for example, 40-50, 100-150, and 200 MHz frequencies (at human safe power levels) is described. The system transmits using a circularly polarized transmit antenna that can provide hemispherical coverage and/or directional cardiod-like patterns. The power is received either using a parasitic loop element coupled to a loop antenna in a wireless mobile device or to a separate loop receive element. The loop antenna is resonated using a series capacitor to cancel the reactance of the loop.

Rectenna power transfer systems usually operate at microwave frequencies and use large phased arrays or parabolic dish antennas. The effective area in those cases is essentially equal to the physical area of the antennas. The systems described herein operate at frequencies that are at least 10 times lower than typical mobile phones. Thus, they operate in a domain where the effective areas are much greater than the physical area. As an example, it takes 2.0 watts of charging to fully charge the battery of a smart phone in 1.5 hours. At the 2.0 watt charging level at 5.8 GHz it would take an incident field of 800 watts/$m^2$ on a 10 element phased array of 5.0 $in^2$ area mounted on a smartphone. The human safe exposure limit is 100 $W/m^2$, which is greatly exceeded. In contrast, the low frequency rectenna, described herein, operating at 100 MHz, only requires an incident field of 2.0 W/m² to generate 2.0 W of charging, which is considerably lower than the safe human exposure limit.

FIGURES

FIG. 9 is a picture of a table top super-directive OMAN Array.

DETAILED DESCRIPTION

Circular Polarization RF Wireless Charging

Figure 1:
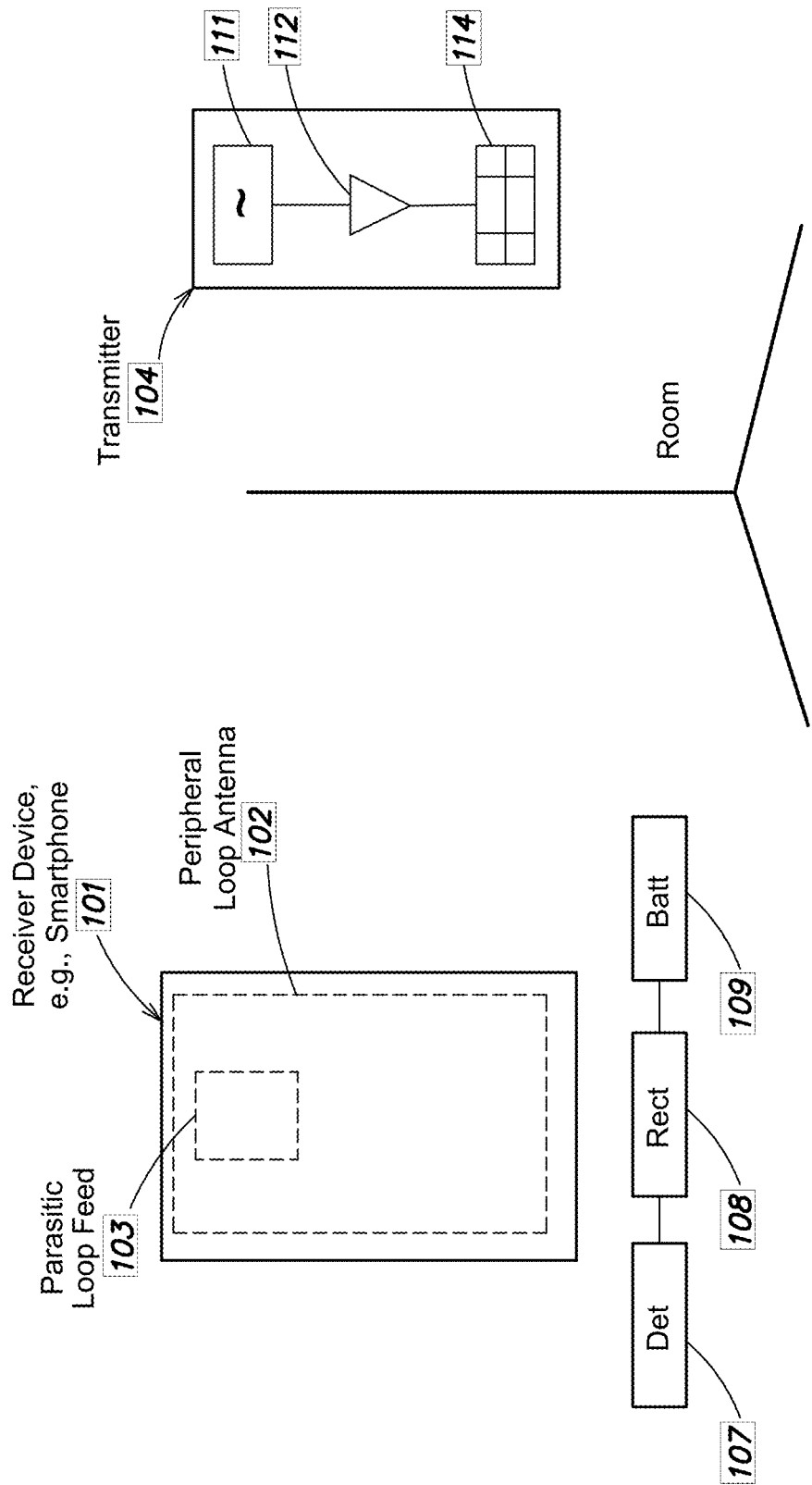
FIG. 1 shows an Orientation Independent (OMAN) antenna array and transmitter mounted on a wall transmitting power to a receiver that has a parasitic loop feed and a peripheral loop antenna.

An antenna based energy transmission system as described herein, and can be seen in FIG. 1. The system includes a transmitter 104 and a receiver 101. Energy is transmitted via radio waves between the transmitter 104 and the receiver 101. The receiver 101 detects 107 and/or rectifies 108 the received signal to extract a power signal, and uses it for some purpose, for example, to recharge a battery 109 or to power some electronic device.

The battery 109 may be installed in any receiver device 101, for example a portable radio, a cell phone, a smart phone, a PDA, a tablet, a laptop computer, a smart watch, a tag, or a number of Internet of Things devices; as well as other devices that currently are not smart devices, such as a flashlight, interior and exterior ornamental lighting, children's toys, tools, etc. In some embodiments, this technique may be used to power devices directly without incorporating a battery, or could be used to charge a capacitor or other energy storage device. In some embodiments using tags, the transmitter 101 may incorporate technology to use the directional nature of the antennas along with signal strength (or time of flight) data to locate the physical location of the tag.

The preferred frequency of operation is governed by the maximum available antenna size vs. frequency. For example, a smart watch implementation operates at 200 MHz with a 2.5 cm (1 inch) square antenna, a smartphone at 50-150 MHz with a 7.5 cm (3 inch) by 15 cm (6 inch) antenna, and a larger device such as a tablet or laptop would be at 50 MHz with a larger antenna. These frequencies may be either selectable or simultaneously transmitted from the transmitter power source. The effective area of these antennas far exceeds their physical dimensions. For instance, the 7.5 cm (3 inch) by 15 cm (6 inch) antenna of a smartphone may have a 1 meter square effective area at 100 MHz and double that at 50 MHz.

The energy transmission system can be used while the device 101 is in use. The power levels and frequencies are safe for users to be present when charging, and safe to charge the receiving device 101 when the user is using the device 101 (holding the phone beside the face).

In addition, the ability to charge while using the smartphone is facilitated by the great difference in the charging frequency and the smartphone operating frequencies. The smartphone operates above 900 MHz while the charging takes place at 50-150 MHz. This allows for a simple filter to be inserted into the normal smartphone antenna to reject the 50-150 MHz energy. To optimize performance, a self-tuning matching network can be implemented on the receive antenna to ensure that the antenna is performing at the correct frequency even in the presence of detuning object, such as a human. One implementation of the matching network is to have a phase lock loop on the transmit frequency using a varactor device.

Transmitter

The transmitter 104, in one embodiment, is an enclosure that is mounted on a ceiling or wall of a room (as depicted) (or mounted in a vehicle or on a table), within the line of sight of the receiving device 101. However, line of sight is not required, as the radio waves will travel through walls and around other obstacles, with a loss of power that may or may not be significant depending on a number of factors.

The transmitter 104 is connected to a power source 110 such as the power grid, a generator, or a battery. In one embodiment, transmitter 104 is connected to a power source such as household AC power. This power could be supplied through a two or three pronged outlet. Power could also be supplied through a screw type light socket in another embodiment, serving as an intermediary device where the transmitter 104 has a socket for a light bulb and screws into a light socket itself. In still another embodiment, the transmitter 104 may take power from a hard-wired smoke detector wire. In this embodiment, the transmitter 104 could be integrated into a smoke detector, or could have mounting plates and power socket to mount the smoke detector below the transmitter 104. In another embodiment, the transmitter 104 may be hardwired to the household AC power, or could be used as an interface to a ceiling fan (or incorporated into a wireless fan itself). With the fan interface, the transmitter 104 is mounted to the ceiling fan, and the ceiling fan mounts to the ceiling, with the transmitter 104 serving as a mechanical and electrical interface between the fan and the ceiling.

The power from this source is used to operate the transmitter 104 that will generate radiated power signal sent via radio waves to the receiver 101. A sine wave generator 111 in the transmitter 104 is used to create a sine wave on an unused frequency near 40-50 Mhz (the unused frequency could be a frequency that does not need an FCC license or could be a frequency that the FCC licenses for this purpose). This is preferably a constant power level, narrow band sine wave containing the signal to be amplified. The sine wave is then amplified by a circuit 112 in the transmitter to the desired radiated power allowed for use near humans. The US Federal Communications Commission specifies a maximum power density of 10 watts/meter² (1 milliwatt per cm²) at the user. The minimum power is based on the power needed to power the receiver, recharging the battery in some embodiments within a desired amount of time at a desired distance. However, the scope of this patent application is not limited to any power level.

The transmitter 104 is coupled to an antenna 114, which may be a circularly polarized antenna such as the various configurations for an Orientation Independent Antenna (OMAN) as described in U.S. Pat. Nos. 8,988,303, 9,013,360, and/or or pending U.S. patent application Ser. No. 15/362,988 filed Nov. 29, 2016 entitled "Super Directive Array of Volumetric Antenna Elements for Wireless Device Applications", all of which are incorporated herein by reference. The OMAN antenna 114 may be shaped as a cube, cylinder, a sphere, or as a U-shaped radiating surface (that is folded over the edges of a rectangular device housing, for example), or may include an array of such elements, etc. More details of such ORIAN antennas are available in the referenced patents and patent applications. Use of these OMAN antennas in the present embodiments should be scaled to operate at the desired low frequencies as described in more detail below. In one embodiment, the antenna 114 on the transmit side is 15 cm (6 inch) by 15 cm (6 inch) by 7.5 cm (3 inch) antenna (225 cm$^2$ surface) in size, and 80-90% efficient at 40-50 MHz. This allows directional transmission of the power using circular polarization, so the receiving device 101 orientation does not matter.

The transmission power in free space is restricted by several factors. These include human exposure safety levels (as described above), usable power levels, and the range that the power should be transmitted.

The transmitter 104 may be placed on the wall or the ceiling (or on a table or in a car), about 10 feet away in one embodiment. The Orientation Independent Antenna 114 can be used to generate a circularly polarized (cpol) cardiod-like pattern in the direction of the device 101 to be charged. Communication between the device to be charged and the OMAN antenna may further facilitate the whole process of charging. For example, the OMAN may be coupled to signal processing circuits and/or a processor (not shown) to determine the direction of the device 101. In other embodiments, the transmitter 101 may utilize a Bluetooth handshake to determine the location of the device to create a beam in that direction. The cpol makes the system independent of the orientation of the phone 101, while the cardiod-like pattern limits exposure to other areas of the room. Also, because of the extra gain provide by the directional pattern, the total received power is increased. In one embodiment, a hemispherical pattern with clear view mounting enables multiple devices 101 to be charged. When multiple devices 101 are charged in the same area at the same time, the effective received power to each device will be diminished by 50%, because the effective area of the antennas overlap. The maximum exposure for the hemispherical pattern will be about 1 watt per meter squared, which is 20 db down from the IEEE, OSHA, ICNIRP and FCC human exposure numbers (10 W/m$^2$ for 10 hour exposure). In another embodiment, power may be distributed equally to the area under the antenna or distributed through focused beams.

Figure 3:
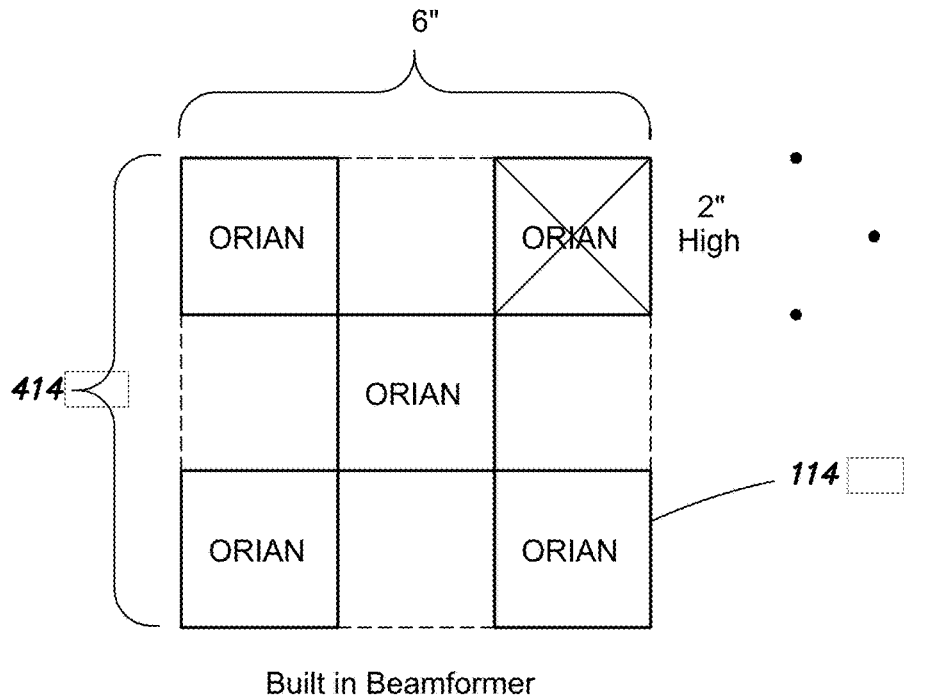
FIG. 3 is a drawing of the ORIAN antenna array with its transmission lobes.
Figure 3:
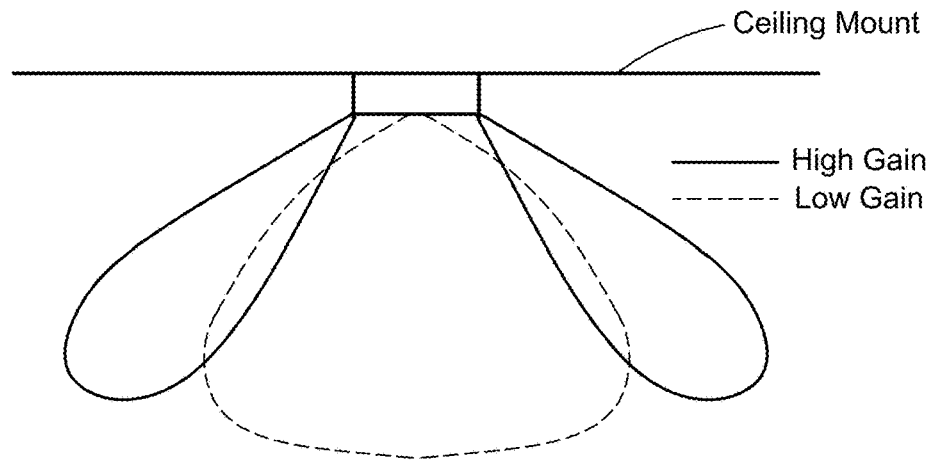

In another embodiment, the OMAN "super gain" antenna may be configured, as shown in FIG. 3, as an array 414 of 5 OMAN antenna elements 114. The array 414 can be used to further shape the antenna lobe into certain directions, as a built-in beam former. Any combination of 8 high gain beams (10 dBi) and one low gain beam may be generated. The high gain array 414 has a bandwidth of 50 kHz at a center frequency around 40-50 MHz. This provides a Q factor of 2000. This configuration allows for an equal power distribution at ground level over a large space in that the beams are simultaneously transmitted and have a gain/range profile which is constant at ground level. Additionally, the beams can be tailored either automatically or manually upon installation to project the power where needed or to avoid obstructions.

Figure 4:
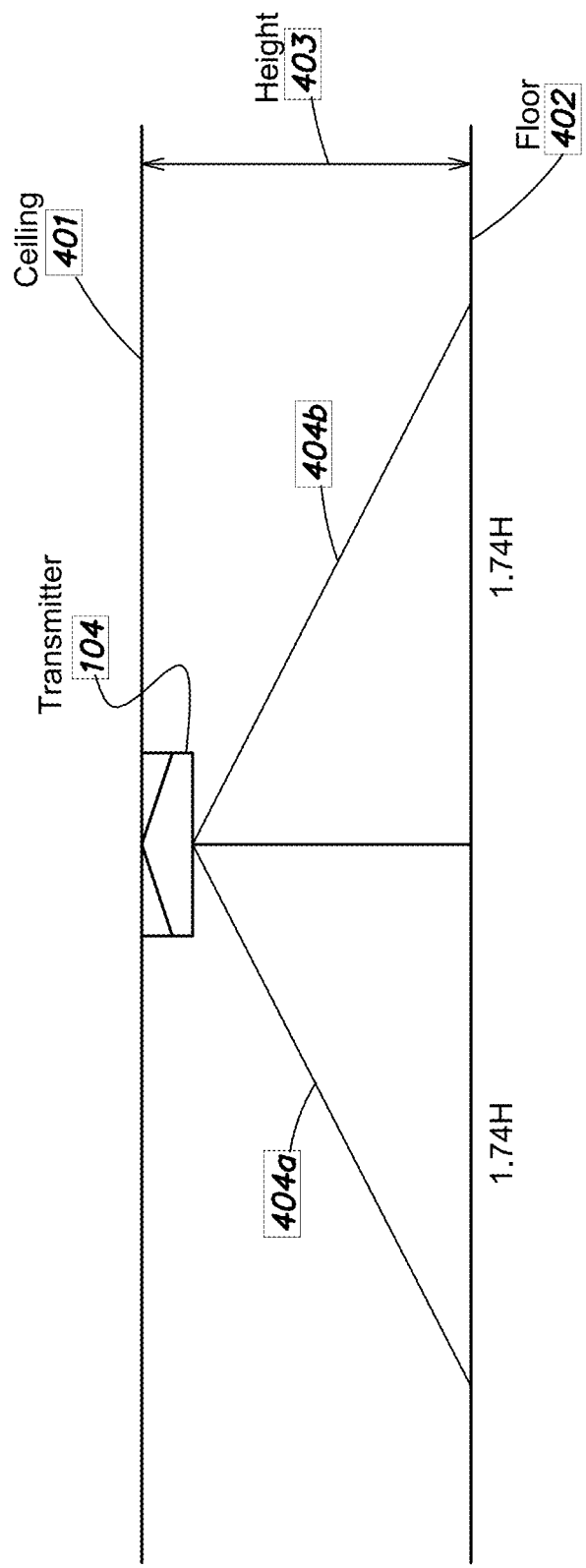
FIG. 4 is a drawing of the ORIAN configuration on the ceiling of a room.

FIG. 4 shows a transmitter 104 on a ceiling 401 transmitting in two power lobes 404a and 404b (any number of lobes could be used) towards the floor 402 (see also the "super gain" array in FIG. 3). The distance between the ceiling 401 and the floor 402 is the height 403. In this drawing, the lobes 404a and 404b are aimed such that the lobes are 1.74 times the height 403 of the room. The transmit array in transmitter 104 uses a tapered circularly polarized superdirective array to generate a constant omni-directional power density along the floor 402. A single beam 404a or 404b can be used to concentrate power along a selected line of bearing. Using a frequency of operation of around 100 MHz, the power vs coverage area is:

| HEIGHT (FT) 403 | COVERAGE (FT$^2$) | TRANSMIT POWER (W) | MODE | CHARGING POWER (W) | FIELD AT DISTANCE (W/m$^2$) |
|---|---|---|---|---|---|
| 10 | 1200 | 100 | omni | 1.5 | 1.2 |
| 10 | 1200 | 12.5 | beam | 1.5 | 1.2 |
| 15 | 2400 | 200 | omni | 1.5 | 1.2 |
| 15 | 2400 | 25 | beam | 1.5 | 1.2 |

Note that in the above chart, Transmit Power is the effective radiated power from the transmitter 104. Charging Power is the power needed to fully charge the device 101 at a fast charge rate. In the Mode column, "beam" means a directional antenna pattern where energy is focused. Omni is energy sent out in a hemispherical pattern. Both are Circularly Polarized (CP).

Figure 5A:
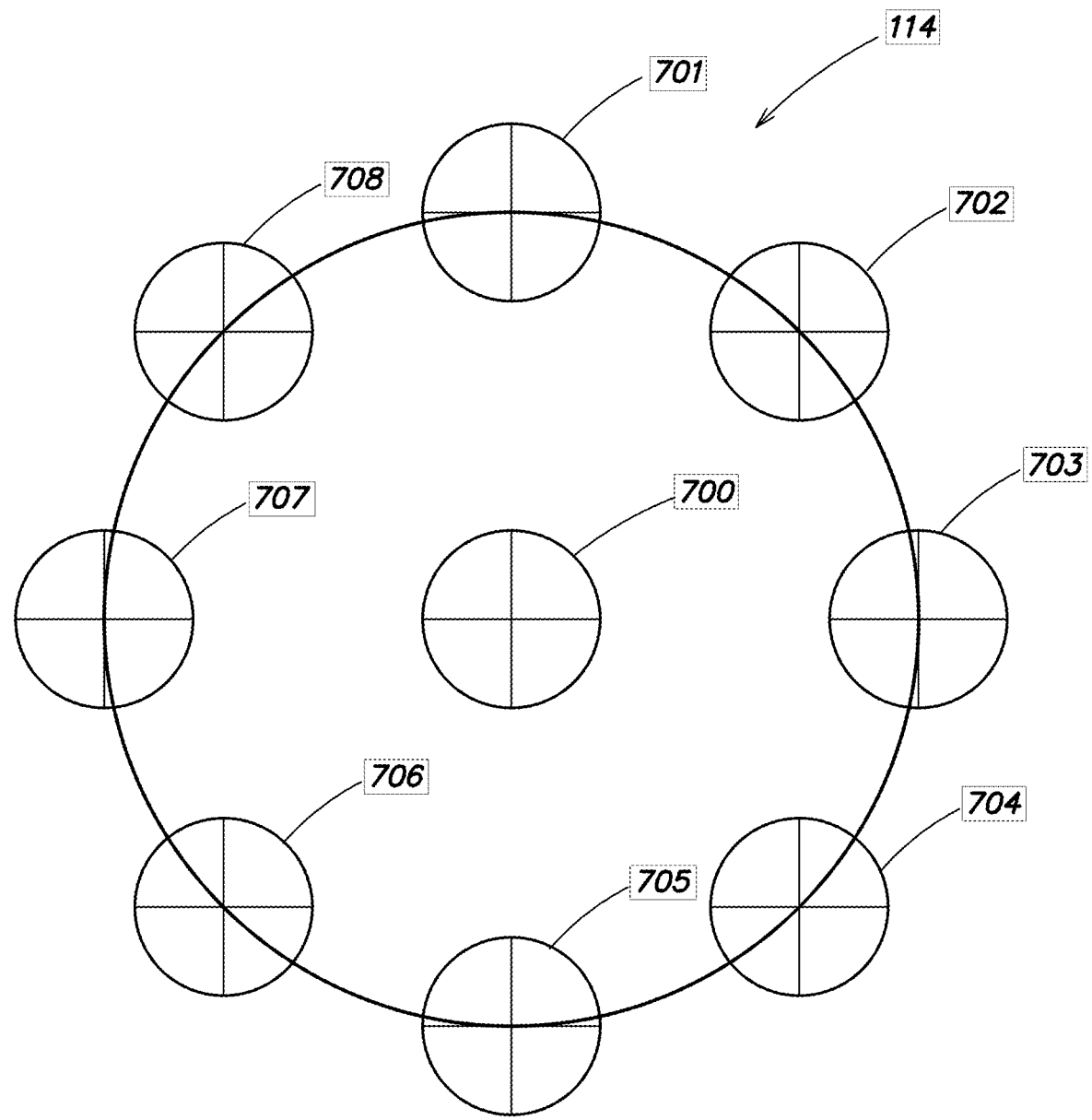
FIG. 5A is a drawing of a circular ORIAN antenna array.

FIG. 5A shows one possible arrangement for antenna 114 of FIG. 1 as a circular array of nine (9) cylindrical, volumetric OMAN antenna elements 700-708, with each element being a separate radiating antenna element. An example element 701 is shown in more detail in FIG. 5B. The cylindrical elements each enclose a volume.

In one embodiment, the total diameter of the assembly is 30 inches with 8 parasitically coupled or active antenna elements 701-708 around the circumference and one active element 700 in the middle.

In one embodiment, the center antenna 700 is active, and the surrounding antennas 701-708 are parasitic. The parasitic elements may be controlled, as described in the pending patent application referenced elsewhere, to provide different polarizations or beamforming. In some implementations (not shown herein), the elements may be arranged in two or more circular arrays around a common center element. Thus each of the antenna elements 701-708 may have a pin diode that is used by a controller (not shown) to turn the associated antenna element 701-708 on or off.

Figure 5B:
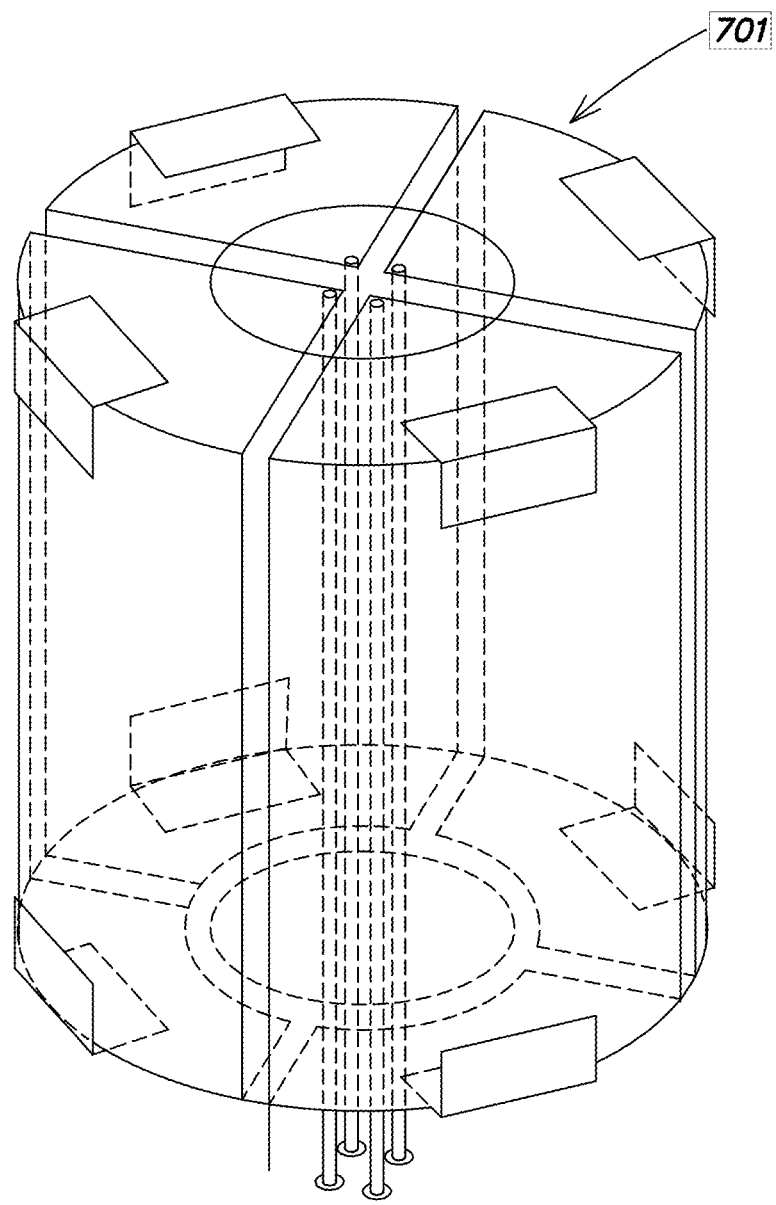
FIG. 5B is an example volumetric cylindrical element of the OMAN array.

FIG. 5B is a more detailed view of one of the volumetric cylindrical elements 1310, 1320 which may include a pair of quadrant sections that provide a pair of crossed dipoles. This type of cylindrical, orientation independent (OMAN) antenna element is described in further detail in U.S. Pat. No. 9,118,116, already incorporated herein by reference above. In FIG. 6A of that patent, elements 601-1 is connected to 601-4. In the present embodiment, it may be that 601-1 is connected to 601-4 with a 100 pf capacitor in series with a pin diode used to disconnect the antenna elements 601-1 and 601-4. Elements 601-2 and 601-3 are similarly connected with a capacitor and pin diode.

Figure 5C:
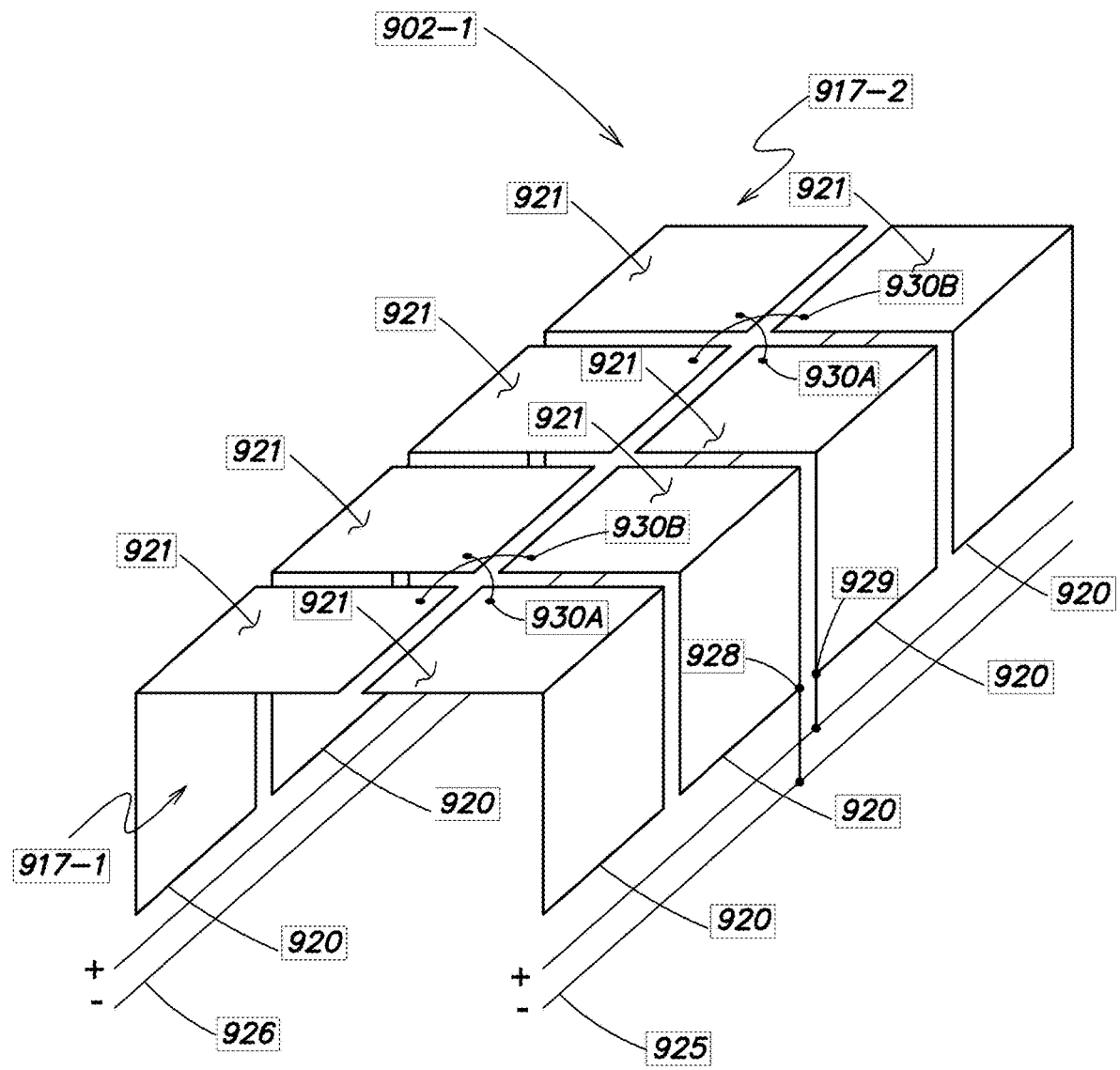
FIG. 5C is an example folded over rectangular element of the OMAN array.

FIG. 5C is another possible embodiment of an OMAN antenna element used in the transmit antenna 114 as described in U.S. patent application Ser. No. 15/362,988 already mentioned above. As explained in that application, the element may take the form of rectangular patch radiators that are folded over into a "u" shape and placed into one or more linear arrays. Each OMAN radiator consisting of a pair of crossed dipoles formed from four patch elements. Here each of the four patches is metal surface disposed on an insulating (dielectric) substrate and a feed point is provided on each radiator. The folded over elements may conform to the outer edges of a device housing.

FIG. 5C is one configuration for an ORIAN element as described in more detail in U.S. patent application Ser. No. 15/362,988 although any of the volumetric ORIAN elements described in that application may be used. Here each OMAN element, or unit cell 902-1, actually consists of two sets of crossed dipoles or OMAN radiators. The first OMAN radiator 917-1 consists of the four patches 921 and four patches 920 closest to the viewer; a second ORIAN 917-2 consist of the eight patches to the rear. Each OMAN 917 thus consists of four patches 921 (shown on the top) and four patches 920 shown on the sides (it being understood that in this view the phone is placed on its edge with patches 920 near the front and rear face and patches 921 near the side). It is understood that the elements 920 and 921 may be a single patch of conductive material or may be two patches interconnected with meander lines and/or capacitances. Feedline 925, 926 may be run along the bottom edge to points 928, 929. Pairs of A,B feedpoints 930-A and 930-B are provided for each OMAN element, similar to that described above. While FIG. 5C shows an arrangement where each unit cell consists of a pair of ORIAN elements (each OMAN in turn consisting of a pair of crossed dipoles) it should be understood that one, two, three or more sets of crossed dipoles could be used to implement each unit cell.

The transmitter 104 may be controlled via voice command (similar to Amazon's Alexa), with a remote control, with buttons or a touchscreen on the actual unit, or through an IoT device. This control could turn the transmitter 104 on and off, direct the transmitter 104 to transmit in an omni mode or in a directional beam mode, to decrease output power, and other functions. In the voice command embodiment, the transmitter 104 may have a speaker to communicate with the user and a microphone to hear the user's commands.

In one embodiment, lights may be added to the transmitter 104 to show the user the direction in which the antenna is transmitting.

FIG. 9 shows a table top super-directive ORIAN array 114 with 5 elements. The center element 03 is powered (directly fed) and the surrounding antennas 01, 02, 04, and 05 are parasitic. This design allows for 8 beams to be directed from the transmitter 104. The parasitic elements may be controlled by the switching in of capacitors with a pin diode. For example, under the control of a software program, the pin diodes in the elements 01, 02, 04, 05 are enabled or disabled to create the directed beam. If all elements 01, 02, 03, 04, 05 are enabled, then there is an omni beam directed throughout the area. To create a direction 6 and 2, elements 02, 03, 04 are enabled. To create direction 8 and 4, elements 01, 03, 05 are enabled. The capacitors tune the elements 01, 02, 04, 05 slightly above or slightly below resonance to act as a director or as a reflector. If a capacitor is not switched on, the element is, in effect, absent. There is a pin diode switch in each element.

Receiver

Figure 2:
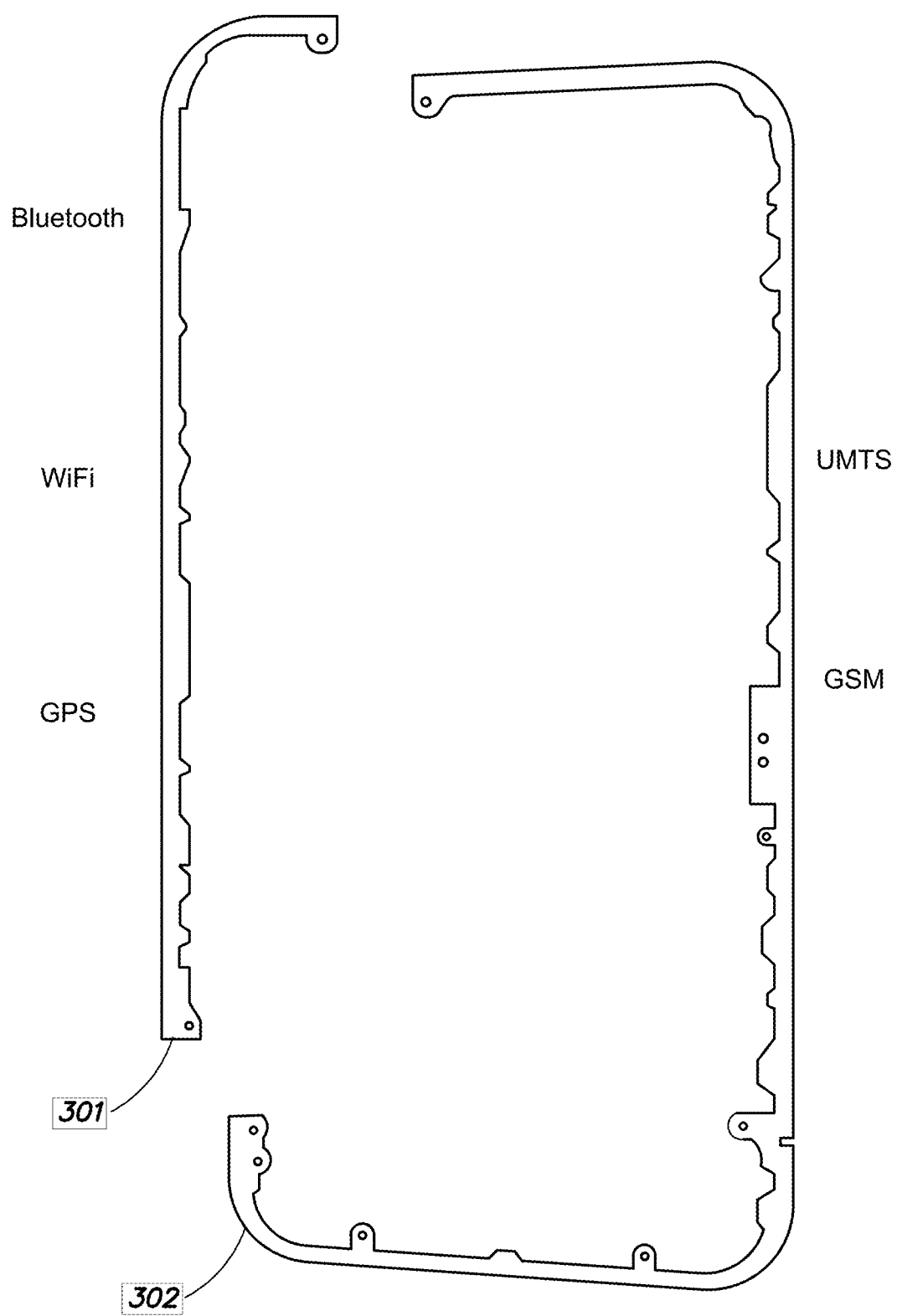
FIG. 2 is a picture of the antennas on an iPhone™ 6.

The receiving antenna could take in the radiated power either from a standard antenna or through a directional antenna. FIG. 2 shows the Apple™ iPhone™ 6 antenna layout with two antennas, one for Bluetooth, Wi-FI and GPS 301 and the other antenna for UTMS and GSM 302. One or both of these antennas may serve as the peripheral loop antenna 102 and be parasitically coupled to the rectification 108 circuit via the parasitic loop 103. The parasitic loop 103 allows a high Q, and detection 107 and/or resonates the loop 102 to improve its efficiency. This antenna could be used to receive power with circuitry added to couple the loop antenna 102 to the battery recharging circuitry. See FIG. 1 for a drawing of the parasitic antenna 103 with the peripheral loop antenna 102. The parasitic loop antenna 102 is a small antenna approximately $\frac{1}{10}^{th}$ the size of the driven loop 103. It allows for coupling energy from the loop 102 without impacting its functionality. One approach is not to have a 50 ohm match to the rectifier 107, 108 which is further enabled by the parasitic feed 103, reducing the need for inductors in the matching circuit.

Other arrangements for peripheral loop 102 are possible. For example, it may be a dedicated wire disposed around the edges of the device 101. In an alternative embodiment, the receiving antenna loop may be installed in a smartphone case, such as an Otter Box, and the radiated power receiving circuitry plugged into the USB port to supply power (for Android) or the Lightning connector (Apple). In this embodiment, the loop antenna may be tuned to the specific frequency of the power transmission system.

Given that the typical smartphone uses about 0.4-0.7 watts on average, the receiver needs to receive about 5 watts to charge the device 101 in an hour (as explained later). New wired chargers such as USB 2.0 Class A technologies use 3 amps at 5 or 9 or 12 volts, or up to 36 watts, allowing for a device to be charged in about 15 minutes. The receive antenna design described herein has an effective area of 1 m$^2$ because we are able to resonate the loop antenna 102. With the FCC maximum power transmission of 10 W/m$^2$ (or 1 mW/cm$^2$), the transmission device 104 has the ability to transmit 10 W in the 1 m$^2$ effective area of the transmitting antenna 114. The 10 watts per m$^2$ allows a smart phone to charge in about 30 minutes. But given that this is a wireless charging without the required user intervention, the device can be charged whenever it is in range. This means that recharge time is less important because the device 101 will charge whenever it is within range of the transmitter 104. In some embodiments, the device 101 could be in use (transmitting and receiving data) and be receiving power at the same time. In other embodiments, the device 101 may be designed to stop accepting power when the device 101 is in use. In still another embodiment, device 101 may have separate antennas for receiving power and for data transmission.

As mentioned briefly above, wireless charging may also be implemented by inserting a dedicated, narrow band, high Q, single turn wire loop 102 into the device 101. The loop 102 may be situated around the periphery of the device. It may be possible to use existing antennas in the device with a similar form factor. The loop may resonate at 40-50 MHz with a Q of 300, providing 80% antenna efficiency. A full wave rectifier 108 may be used to convert the RF to DC. Coupling to the loop is preferably parasitic, using a coplanar inner loop 103. This provides about 1 square meter of effective area for the average device size. A generic device uses 0.437 watts on the average. To charge at 0.437 watts requires an incident wave front of 0.55 watts/square meter into the 40-50 MHz loop. Rectifier losses of 10% will require about 0.6 watts/square meter incident.

Charging can occur whenever the device 101 is within range of the transmitter 104. Once the battery 109 is full, in one embodiment, the transmitter 104 and/or receiver 101 may switch to a trickle charge so that the device will have a full battery when leaving the area near the transmitter. In another embodiment, the charging could stop once the device is full, or only charge when the battery drops to a certain fullness level.

Figure 6:
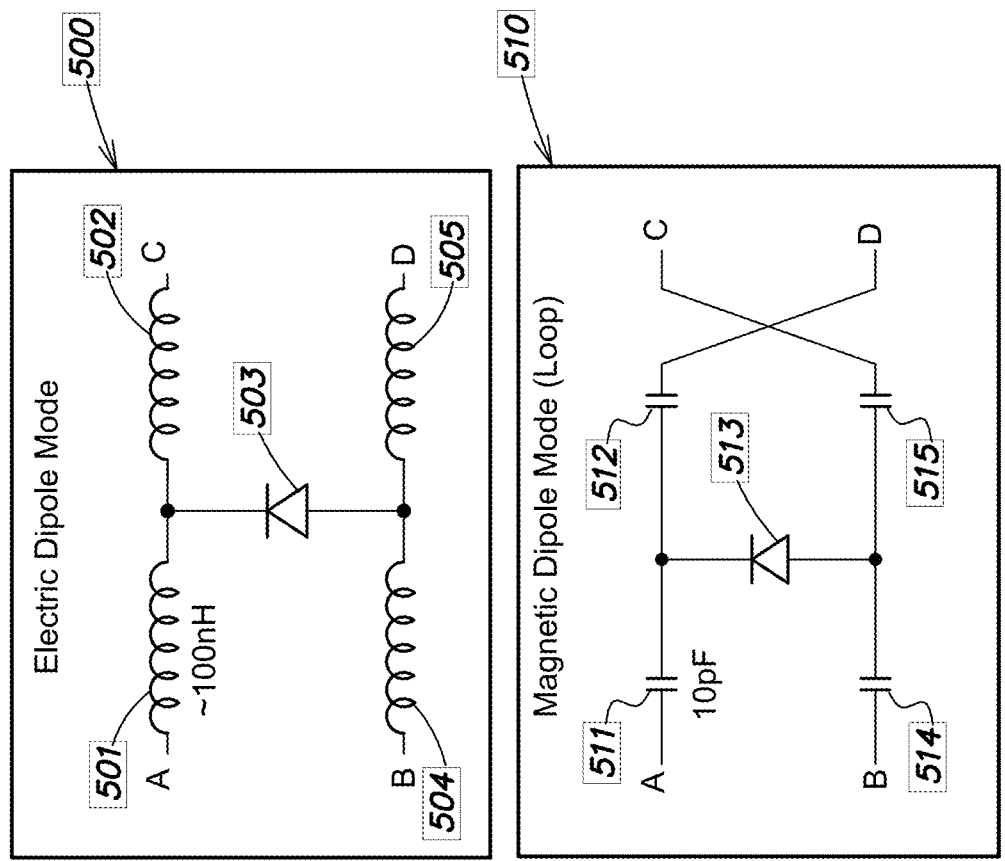
FIG. 6 is a dual mode receive antenna for a wireless configuration.
Figure 6:
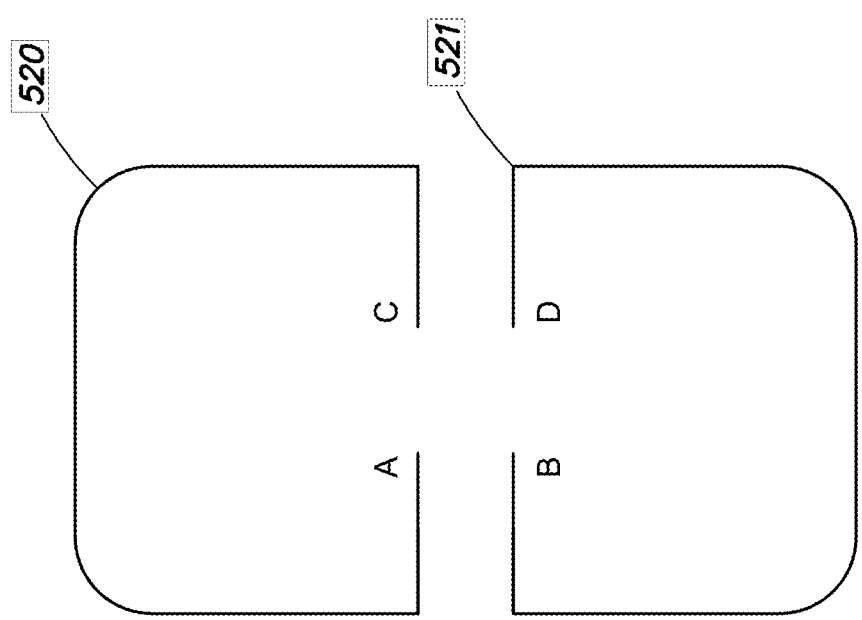

FIG. 6 shows a dual mode receive antenna using two loops 520, 521 for wireless charging. Here, a solid-state switch chooses between two different matching networks (electric dipole or magnetic dipole)(antenna modes) 500,510 chosen based on the highest signal strength. Hardware or software in the receiving device (phone, tablet, etc.) tries both matching networks 500,510, and chose the mode with the highest signal strength. The signal strength could vary based on the orientation of the receiving device or interference, or perhaps by the body of the user. In one embodiment, the device's accelerometers may be used to determine the orientation of the receiving device and that orientation used to choose which mode 500, 510 to use.

The matching networks are designed to be as close to the impedance of the antenna elements as possible in order to achieve maximum efficiency. In some cases, the impedance is about 0.5 ohms. In one embodiment, another matching circuit could be added to allow the device 101 to also receive power from an inductive wireless charging pad such as those designed to work with the Qi, Rezience, or Power Matters Alliance (PMA) standards.

In the first mode 500 (See also FIG. 7A), the electric dipole mode, the antenna 520, 521 is matched with four inductors 501,502, 503, 504, each inductor being about 100 nano-Henry. The inductors 501,502, 503, 504 are configured in an H structure with a diode equivalent 503 in the middle. Inductor 501 connects the A terminal on antenna 520 with inductor 502 (which then connects to the C terminal on antenna 520) and the diode equivalent 503. Inductor 504 connects the B terminal on antenna 521 with inductor 505 (which then connects to the D terminal on antenna 521) and the diode equivalent 503. The diode equivalent 503 appears to this circuit to be a diode, but actually is a rectifier circuit from which the power from the antenna is tapped.

In the second mode 510 (see FIG. 7B), the magnetic dipole (loop) mode, the antenna 520, 521 is matched with four capacitors 511,512, 513, 514, each capacitor being about 10 Pico farads. The capacitors 511,512, 513, 514 are configured in an HX structure with a diode equivalent 513 in the middle. Capacitor 511 connects the A terminal on the antenna 520 with capacitor 512 (which then connects to the D terminal on antenna 521) and the diode equivalent 513. Conductor 514 connects the B terminal on the antenna 521 with conductor 515 (which then connects to the C terminal on antenna 520) and the diode equivalent 513. The diode equivalent 513 appears to this circuit to be a diode, but actually is a rectifier circuit from which the power from the antenna is tapped.

Figure 7A:
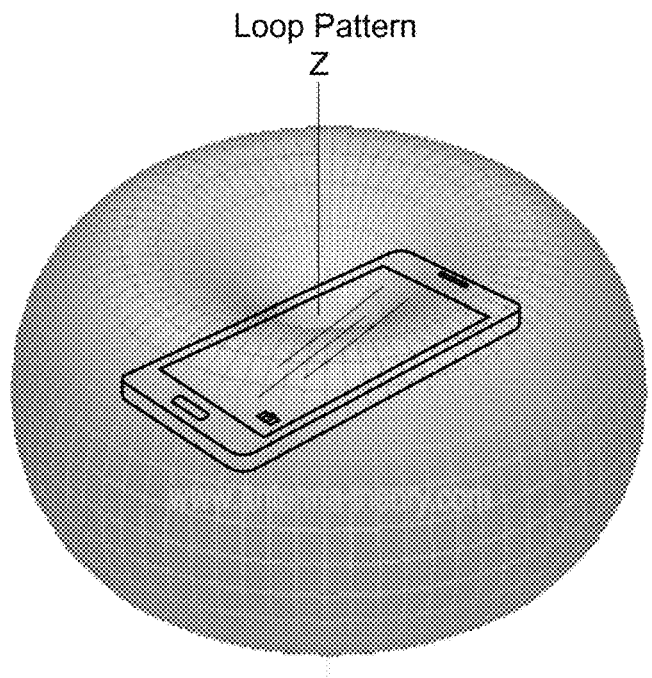
FIG. 7A is an antenna receive signal strength for a Loop antenna configuration.
Figure 7B:
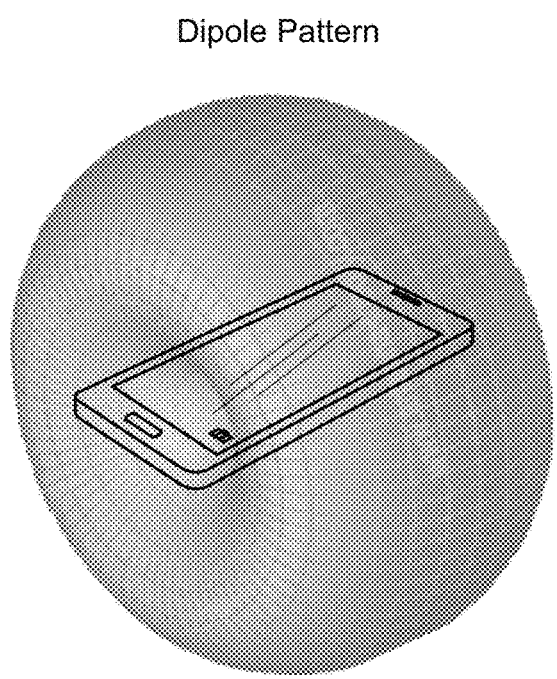
FIG. 7B is an antenna receive signal strength for a Dipole antenna configuration.

FIG. 7A shows the antenna pattern for mode 500. This shows a dead zone at the center point on the face and back of the cell phone, but good coverage around each of the edges. FIG. 7B shows the antenna pattern of the mode 510. This shows a dead zone in the middle of the top and bottom short edges, but good coverage around the center and long edges of the phone.

Figure 8:
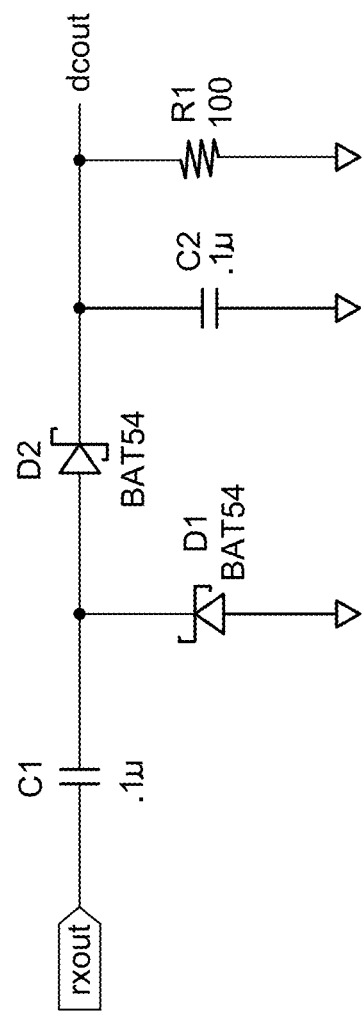
FIG. 8 is a schematic diagram of a rectifier.
Figure 8:
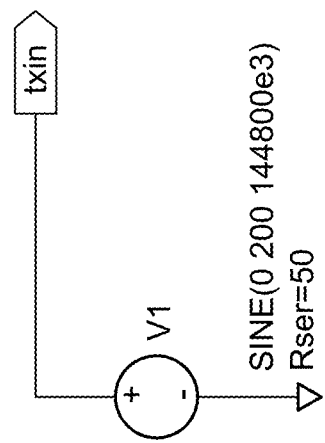

FIG. 8 is a schematic of a possible rectifier circuit for the receiver 101. This rectifier circuit is the diode equivalent 503, 513 in FIG. 6. Efficiency is important as more power is delivered to the target with a high efficiency. In one embodiment, transmit power is modulated to ensure the diodes in the receive rectifier are operating in the optimal portion of their performance curve while staying within safe transmission levels.

One or more of the loop antennas used in the receiving device may also be provided by a certain operating mode of the folded over rectangular OMAN antennas described in U.S. patent application Ser. No. 15/362,988 already mentioned above. For example, the OMAN elements shown in FIGS. 1, 3A, 6A-6D and elsewhere in that application may take the form of rectangular patch elements that are folded over into a "u" shape and placed onto, inside of, and/or near the front and back of the housing of a device such as a mobile phone or tablet device. As also explained in that application, the patch elements may be connected in a loop using frequency-depending couplings such as meander lines. The meander lines may short the OMAN elements into a loop for the lower frequencies used for charging, but then isolate them into the individual radiating array elements for operating at radio frequencies in the 4G/5G band.

Communications

In one embodiment, the receiving device 101 may also communicate data with the transmitter 104 using Bluetooth, Near Field Communication (NFC), or Wi-Fi (or similar wireless protocol) as soon as the devices detect each other's presence. The communications could include information on the identity of the specific device, the battery level, and details on the battery and the device. The transmitter 104 may send its power transmission capability, its identity, and device identifying information. With these communications, the transmitter 104 and receiver 101 may determine the direction of the other device and the distance. Distance may be calculated using Receive Signal Strength Indicator (RSSI) and/or Time of Flight (ToF). The directional antenna characteristics of the OMAN antenna also allow the transmitter 104 to know the direction (angle from a fixed point on the transmitter) to the receiving device 101.

With the direction and angle, the directional antenna may focus the power only towards the receiving device 101 at a power level needed by the receiving device 101. This increases energy efficiency. Furthermore, the power may be scaled back or turned off if the battery is full. The transmitter 104 and receiver 101 may monitor the signal strength and move the focused power beam as the receiving device 101 moves.

In one embodiment, the data from the receiver 101 may be encoded on signals reflected back from the receiver 101, where the receiving device alters the reflection of the signals in a way to encode data. In another embodiment, the data may be transmitted using the power scavenged from the received RF signals, such as in passive RFID technology.

In one embodiment, the transmitter 104 may charge multiple phones at the same time by focusing multiple beams at multiple receivers. Alternatively the beams could be time multiplexed in different directions to power different devices.

In one embodiment, the receiver 101 may monitor the strength of the signal being received from the transmitter 104, and detect a reduction in the power based on interference from a person or from a wall. If interference is detected, the receiver 101 may ask the transmitter 104 to switch from a focused beam to a broad beam so that powering may continue, albeit at a reduced power level. In another embodiment, the transmitter could detect if certain people come into the room by looking for their cell phone, and when that user arrives in the room, the transmitter shuts off until the user leaves the room.

Low Power Operation

If the battery in device 101 is completely dead, there is an issue with having power to establish the protocol and starting the recharging process. One option is to reserve a small amount of power in the battery of the smartphone (assuming the receiver 101 is a smartphone in this example) to run the recharging circuit. Given that the phone itself needs significant power to operate, and the recharging circuit needs only a small amount of power, the recharging circuit may listen for transmissions from the transmitter 104, and respond with a simple message requesting full power. Once the battery is recharged a bit, the transmitter 104 and receiver 101 may then exchange full information. In another embodiment, an RFID type circuit may be implemented to inform the transmitter 104 how to send because the battery is dead. This RFID circuit could be disabled when the battery has power and only active when there is no power to actively respond. There may be other circumstances where the only way to get power into the battery is through wired charging.

In some embodiments, a command (via remote, voice, or button input) may need to be given to the transmitter 104 to transmit power in uniform or hemispherical mode so that the power is available to the receiver 101, perhaps until the receiver 101 has enough power to direct the transmitter to focus a beam.

In one embodiment, the transmitter 104 or the receiver 101 may limit the capabilities or refuse to power devices unless the device is from a certain manufacturer or on an approved vendor list. The imitations could be enforced in software based on information exchanged between the transmitter 104 and receiver 101. Either the transmitter 104 or receiver 101 could enforce this restriction. This allows for closed powering systems. To ensure that the transmitting unit 194 is an approved device, as to prevent damage to the receiving device 101, a limited bandwidth coded waveform may be periodically sent. The receiving device then recognizes the waveform sent by the transmitting unit as an approved wireless charger. The waveform may be a phase modulation of the CW power waveform so as not to reduce the waveform power. The sideband of the phase modulation may be offset from the waveform to facilitate detection.

The use of a modulated waveform may also be used as a means of access. Similar to needing a WiFi code to gain access to a hotspot, an access code may be used to allow for the receiving device to see the power being transmitted by the transmitting device.

In another embodiment, charging may be limited to a fixed number of devices at a time, such as for sales to a residential community. Another model could power a large number of devices in a public area, such as a coffee shop.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A wireless power apparatus comprising:
   a first loop antenna;
   a second loop antenna;
   a circuit connected to the first and second loop antennas, the circuit to selectively operate the loop antennas in two operating modes for receiving wireless power, a first receive mode being an electric dipole mode providing a radiation pattern having a major axis in a first direction, and a second receive mode being an electric loop mode providing a radiation pattern having a major axis in a second direction orthogonal to the first direction; and
   wherein in the electric dipole mode, terminals of the first and second loop antennas are coupled to four inductors configured in an H structure with a diode equivalent element disposed in the middle thereof, from which power is tapped to a chargeable device.

2. The apparatus of claim 1 wherein at least one of the first or second loop antennas further comprise:
   an array of two or more folded over patch radiators, operable to control a direction of a receive radiation beam.

3. The apparatus of claim 2 additionally comprising:
   a combining circuit, coupled to the array of patch radiators, to control a polarization of the receive radiation beam.

4. The apparatus of claim 1 wherein:
   the first loop antenna is additionally connected to a wireless communication transceiver for providing wireless communication; and
   the second loop antenna is selectively parasitically coupled to the first loop antenna.

5. The apparatus of claim 1 wherein the first loop antenna is located adjacent an internal periphery of a wireless device housing.

6. The apparatus of claim 5 wherein the second loop antenna is located inboard of the first loop antenna.

7. The apparatus of claim 5 wherein the device housing is a rectangular housing having a face, a back, a top edge, a bottom edge, a left side edge and a right side edge, and the first mode provides a radiation pattern having a dead zone aligned with the face and back, and the second mode provides a radiation pattern having a dead zone aligned with the top and bottom edges.

8. The apparatus of claim 1 wherein in the electric loop mode, terminals of the first and second loop antennas are coupled to four capacitors configured in an HX structure with a diode equivalent in the middle thereof, from which power is tapped to a chargeable device.

9. The apparatus of claim 1 additionally comprising:
   a transmit antenna that selectively operates in at least two directional modes.

10. The apparatus of claim 9 wherein the transmit antenna further comprises a selectively polarized radiating structure.

11. The apparatus of claim 10 wherein the transmit antenna is a directional array additionally comprising a plurality of circularly polarized radiating structures.

12. The system of claim 9 wherein the transmit antenna is a directional array additionally comprising a plurality of circularly polarized radiating structures.

13. The apparatus of claim 1 wherein the circuit additionally comprises:
   a first and second matching network;
   a receive signal strength detector selectively coupled to either the first and second matching network; and
   additional circuitry for selecting either the first operating mode or the second operating mode depending on which matching network provides greater output from the receive signal strength detector.

14. The system of claim 1 wherein an effective area of each of the first and second loop antennas is at least one square meter.

15. The system of claim 1 wherein an effective area of each of the first and second loop antennas is greater than a physical area of the device.

16. The system of claim 1 wherein the first loop antenna is one-tenth or less of a size of the second loop antenna.

* * * * *